(12) United States Patent
Yu

(10) Patent No.: US 11,531,245 B2
(45) Date of Patent: Dec. 20, 2022

(54) SMART WINDOW, SMART WINDOW SYSTEM, METHOD OF OPERATING SMART WINDOW, AND METHOD OF FABRICATING SMART WINDOW

(71) Applicant: BOE Technology Group Co., Ltd., Beijing (CN)

(72) Inventor: Lu Yu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 302 days.

(21) Appl. No.: 16/638,941

(22) PCT Filed: Mar. 8, 2019

(86) PCT No.: PCT/CN2019/077521
§ 371 (c)(1),
(2) Date: Feb. 13, 2020

(87) PCT Pub. No.: WO2020/181424
PCT Pub. Date: Sep. 17, 2020

(65) Prior Publication Data
US 2021/0215989 A1    Jul. 15, 2021

(51) Int. Cl.
*G02F 1/153* (2006.01)
*G02F 1/03* (2006.01)
(Continued)

(52) U.S. Cl.
CPC ............ *G02F 1/163* (2013.01); *E06B 3/6722* (2013.01); *E06B 9/24* (2013.01); *G02F 1/155* (2013.01);
(Continued)

(58) Field of Classification Search
CPC ...... G02F 1/155; G02F 1/1523; G02F 1/1525; G02F 1/1521; G02F 1/1533; G02F 1/03;
(Continued)

(56) References Cited

U.S. PATENT DOCUMENTS

| 9,130,397 | B2 | 9/2015 | Leabman et al. |
| 9,252,628 | B2 | 2/2016 | Leabman et al. |

(Continued)

FOREIGN PATENT DOCUMENTS

| CN | 101989822 A | 3/2011 |
| CN | 103649826 A | 3/2014 |

(Continued)

OTHER PUBLICATIONS

International Search Report & Written Opinion dated Dec. 6, 2019, regarding PCT/CN2019/077521.

(Continued)

*Primary Examiner* — Dawayne Pinkney
(74) *Attorney, Agent, or Firm* — Intellectual Valley Law, P.C.

(57) ABSTRACT

A smart window configured to transition between a substantially transparent state and a dimmed state. The smart window includes a first substantially transparent conductive layer; an ion storage layer on the first substantially transparent conductive layer; an electrolyte layer on a side of the ion storage layer away from the first substantially transparent conductive layer; an electrochromic layer on a side of the electrolyte layer away from the ion storage layer; a second substantially transparent conductive layer on a side of the electrochromic layer away from the electrolyte layer; and an antenna layer configured to receive wireless power transmissions to provide energy for the smart window to transition between the substantially transparent state and the dimmed state. An orthographic projection of the electrochromic layer on the first substantially transparent conductive layer substantially covers an orthographic projection of the antenna layer on the first substantially transparent conductive layer.

18 Claims, 4 Drawing Sheets

(51) Int. Cl.
*G02F 1/15* (2019.01)
*G09G 3/19* (2006.01)
*G09G 3/38* (2006.01)
*G02F 1/163* (2006.01)
*H02J 50/27* (2016.01)
*E06B 3/67* (2006.01)
*E06B 9/24* (2006.01)
*G02F 1/1523* (2019.01)
*G02F 1/155* (2006.01)

(52) U.S. Cl.
CPC ............ *G02F 1/1525* (2013.01); *H02J 50/27* (2016.02); *E06B 2009/2464* (2013.01); *G02F 2203/01* (2013.01)

(58) Field of Classification Search
CPC .......... G02F 1/0316; G02F 3/16; G02F 1/163; C09K 9/02; B60R 1/088; H04N 9/3137; H04N 9/22
USPC ................ 359/265–275, 277, 245–247, 242; 345/49, 105, 107; 248/817; 438/929
See application file for complete search history.

(56) References Cited

U.S. PATENT DOCUMENTS

| | | | |
|---|---|---|---|
| 2008/0129441 A1* | 6/2008 | Darr .................... | H01H 85/30 337/206 |
| 2010/0259811 A1 | 10/2010 | Wu et al. | |
| 2011/0030757 A1 | 2/2011 | Lin et al. | |
| 2011/0148218 A1 | 6/2011 | Rozbicki | |
| 2012/0293855 A1 | 11/2012 | Shrivastava et al. | |
| 2015/0323576 A1* | 11/2015 | Bulja .................... | G01R 27/06 324/638 |
| 2016/0026060 A1* | 1/2016 | Koo ...................... | G02F 1/163 345/212 |
| 2017/0212399 A1* | 7/2017 | Tarng .................... | G02F 1/163 |
| 2018/0090992 A1* | 3/2018 | Shrivastava ............ | H02J 50/20 |
| 2019/0131721 A1* | 5/2019 | Dani .................... | H01Q 21/005 |
| 2020/0150508 A1* | 5/2020 | Patterson ............... | H02J 50/80 |

FOREIGN PATENT DOCUMENTS

| | | |
|---|---|---|
| CN | 104102060 A | 10/2014 |
| CN | 205121123 U | 3/2016 |
| CN | 106997134 A | 8/2017 |
| CN | 104730795 B | 5/2018 |
| CN | 108519710 A | 9/2018 |
| CN | 109314307 A | 2/2019 |
| WO | 2017192881 A1 | 11/2017 |

OTHER PUBLICATIONS

First Office Action in the Chinese Patent Application No. 201980000266.7, dated Jun. 8, 2021; English translation attached.

* cited by examiner

SMART WINDOW, SMART WINDOW SYSTEM, METHOD OF OPERATING SMART WINDOW, AND METHOD OF FABRICATING SMART WINDOW

CROSS-REFERENCE TO RELATED APPLICATION

This application is a national stage application under 35 U.S.C. § 371 of International Application No. PCT/CN2019/077521, filed Mar. 8, 2019, the contents of which are incorporated by reference in the entirety.

TECHNICAL FIELD

The present invention relates to smart technology, more particularly, to a smart window, a smart window system, a method of operating a smart window, and a method of fabricating a smart window.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. Examples of electrochromic materials include tungsten oxide (WO3). Tungsten oxide is a cathodic electrochromic material in which a coloration transition, transparent to blue, occurs by electrochemical reduction.

SUMMARY

In one aspect, the present invention provides a smart window configured to transition between a substantially transparent state and a dimmed state, comprising a first substantially transparent conductive layer; an ion storage layer on the first substantially transparent conductive layer; an electrolyte layer on a side of the ion storage layer away from the first substantially transparent conductive layer; an electrochromic layer on a side of the electrolyte layer away from the ion storage layer; a second substantially transparent conductive layer on a side of the electrochromic layer away from the electrolyte layer; and an antenna layer configured to receive wireless power transmissions to provide energy for the smart window to transition between the substantially transparent state and the dimmed state; wherein an orthographic projection of the electrochromic layer on the first substantially transparent conductive layer substantially covers an orthographic projection of the antenna layer on the first substantially transparent conductive layer.

Optionally, the antenna layer covers at least 50% of an entire light transmitting area of the smart window.

Optionally, the antenna layer covers at least 80% of an entire light transmitting area of the smart window.

Optionally, the antenna layer covers at least 90% of an entire light transmitting area of the smart window.

Optionally, a first terminal of the antenna layer is electrically connected to the first substantially transparent conductive layer; and a second terminal of the antenna layer is electrically connected to the second substantially transparent conductive layer.

Optionally, the smart window further comprises a converter electrically connected to the antenna layer and configured to convert the wireless power transmissions received by the antenna layer into an electrical energy.

Optionally, the antenna layer is configured to receive a radio frequency; and the converter is a radio frequency converter configured to convert the radio frequency into the electrical energy.

Optionally, the smart window further comprises a first substantially transparent base layer and a second substantially transparent base layer facing the first substantially transparent base layer; wherein the first substantially transparent conductive layer, the ion storage layer, the electrolyte layer, the electrochromic layer, and the second substantially transparent conductive layer are sandwiched between the first substantially transparent base layer and the second substantially transparent base layer.

Optionally, the antenna layer is on a side of the second substantially transparent conductive layer away from the electrochromic layer.

Optionally, the antenna layer comprises a substantially transparent material.

Optionally, the substantially transparent material is selected from a group consisting of silver coated polyester film, indium tin oxide, and fluorine doped tin oxide.

Optionally, the antenna layer comprises a slotted waveguide antenna.

In another aspect, the present invention provides a smart window system, comprising the smart window described herein or fabricated by a method described herein; and a wireless power transmission source configured to transmit the wireless power transmissions to the antenna layer.

In another aspect, the present invention provides a method of operating a smart window, comprising integrating an antenna layer in a smart window configured to transition between a substantially transparent state and a dimmed state; receiving wireless power transmissions by the antenna layer to provide energy for the smart window to transition between the substantially transparent state and the dimmed state; and powering the smart window to transition between the substantially transparent state and the dimmed state; wherein the smart window comprises a first substantially transparent conductive layer; an ion storage layer on the first substantially transparent conductive layer; an electrolyte layer on a side of the ion storage layer away from the first substantially transparent conductive layer; an electrochromic layer on a side of the electrolyte layer away from the ion storage layer; and a second substantially transparent conductive layer on a side of the electrochromic layer away from the electrolyte layer; wherein an orthographic projection of the electrochromic layer on the first substantially transparent conductive layer substantially covers an orthographic projection of the antenna layer on the first substantially transparent conductive layer.

Optionally, the method further comprises generating the wireless power transmissions by a wireless power transmission source; and transmitting the wireless power transmissions to the antenna layer.

Optionally, the method further comprises determining whether a present power capacity of the smart window is below a threshold value; wherein the wireless power transmission source generates the wireless power transmissions upon a determination that the present power capacity of the smart window is below the threshold value.

Optionally, the wireless power transmissions is received by the antenna layer covering at least 50% of an entire light transmitting area of the smart window.

Optionally, the wireless power transmissions is received by the antenna layer covering at least 80% of the entire light transmitting area of the smart window.

Optionally, the wireless power transmissions is received by the antenna layer covering at least 90% of the entire light transmitting area of the smart window.

In another aspect, the present invention provides a method of fabricating a smart window configured to transition between a substantially transparent state and a dimmed state, comprising forming a first substantially transparent conductive layer; forming an ion storage layer on the first substantially transparent conductive layer; forming an electrolyte layer on a side of the ion storage layer away from the first substantially transparent conductive layer; forming an electrochromic layer on a side of the electrolyte layer away from the ion storage layer; forming a second substantially transparent conductive layer on a side of the electrochromic layer away from the electrolyte layer; and forming an antenna layer configured to receive wireless power transmissions to provide energy for the smart window to transition between the substantially transparent state and the dimmed state by depositing an antenna material on a layer of the smart window and patterning the antenna material; wherein the antenna layer is formed so that an orthographic projection of the electrochromic layer on the first substantially transparent conductive layer substantially covers an orthographic projection of the antenna layer on the first substantially transparent conductive layer.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Electrochromic windows require electricity when they are discolored, requiring only a few volts per color change, and usually only need to change color several times a day. The electrochromic windows may be powered by a charging cable or a battery. The use of an external charging cable is unsightly and requires additional installation costs. Battery power requires regular battery replacement, increasing maintenance costs.

Accordingly, the present disclosure provides, inter alia, a smart window, a smart window system, a method of operating a smart window, and a method of fabricating a smart window that substantially obviate one or more of the problems due to limitations and disadvantages of the related art. In one aspect, the present disclosure provides a smart window configured to transition between a substantially transparent state and a dimmed state. In some embodiments, the smart window includes a first substantially transparent conductive layer; an ion storage layer on the first substantially transparent conductive layer; an electrolyte layer on a side of the ion storage layer away from the first substantially transparent conductive layer; an electrochromic layer on a side of the electrolyte layer away from the ion storage layer; a second substantially transparent conductive layer on a side of the electrochromic layer away from the electrolyte layer; and an antenna layer configured to receive wireless power transmissions to provide energy for the smart window to transition between the substantially transparent state and the dimmed state. Optionally, an orthographic projection of the electrochromic layer on the first substantially transparent conductive layer substantially covers an orthographic projection of the antenna layer on the first substantially transparent conductive layer. As used herein, the term "substantially covers" refers to one orthographic projection being at least 50%, at least 60%, at least 70%, at least 80%, at least 90%, at least 95%, at least 99%, or 100% covered by another orthographic projection.

Figure 1:
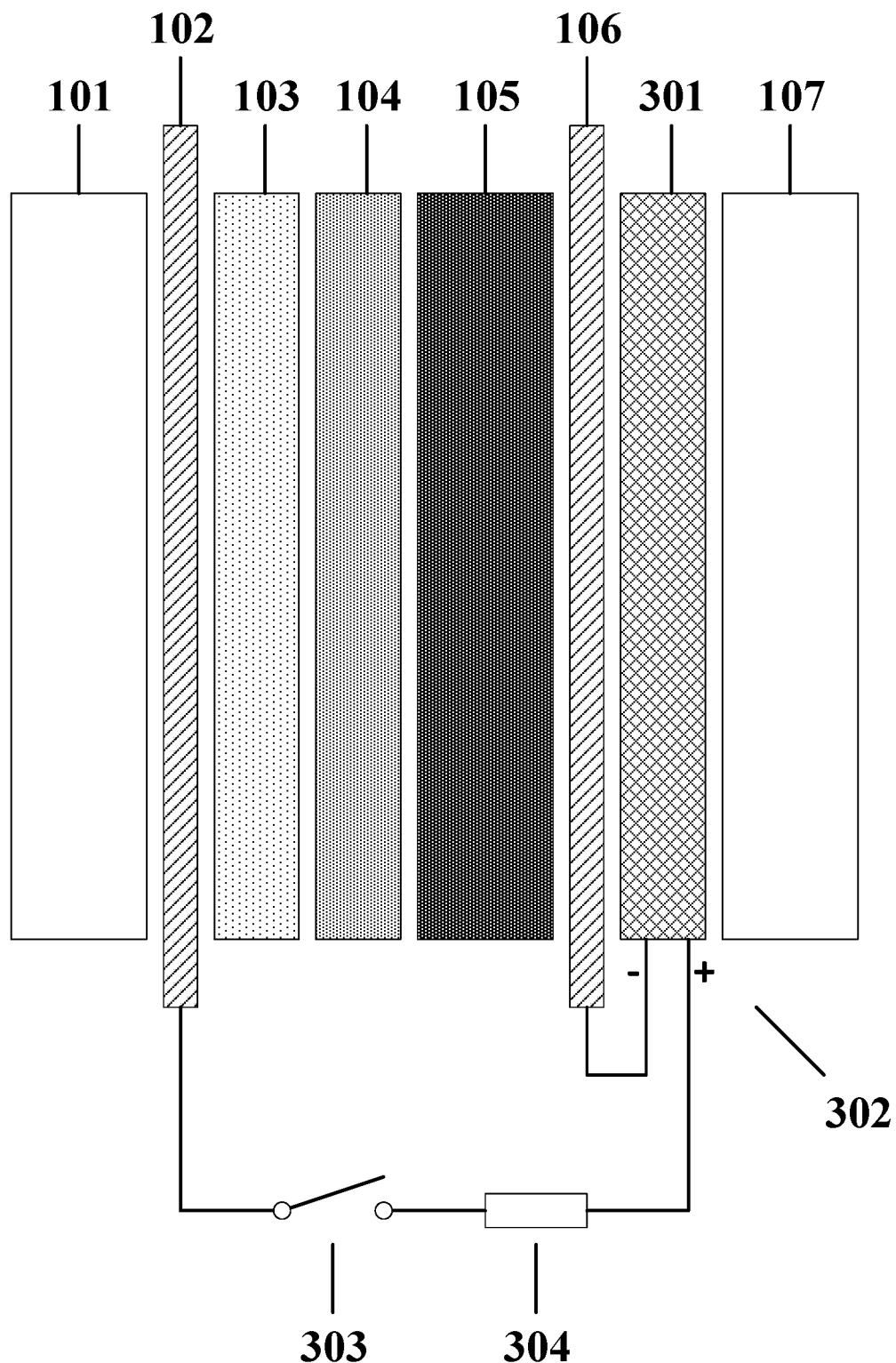
FIG. 1 is a schematic diagram illustrating the structure of a smart window in some embodiments according to the present disclosure.

FIG. 1 is a schematic diagram illustrating the structure of a smart window in some embodiments according to the present disclosure. Referring to FIG. 1, the smart window in some embodiments includes a first substantially transparent conductive layer 102; an ion storage layer 103 on the first substantially transparent conductive layer 102; an electrolyte layer 104 on a side of the ion storage layer 103 away from the first substantially transparent conductive layer 102; an electrochromic layer 105 on a side of the electrolyte layer 104 away from the ion storage layer 103; a second substantially transparent conductive layer 106 on a side of the electrochromic layer 105 away from the electrolyte layer 104; and an antenna layer 301 configured to receive wireless power transmissions to provide energy for the smart window to transition between the substantially transparent state and the dimmed state. Optionally, an orthographic projection of the electrochromic layer 105 on the first substantially transparent conductive layer 102 substantially covers an orthographic projection of the antenna layer 301 on the first substantially transparent conductive layer 102.

Figure 2:
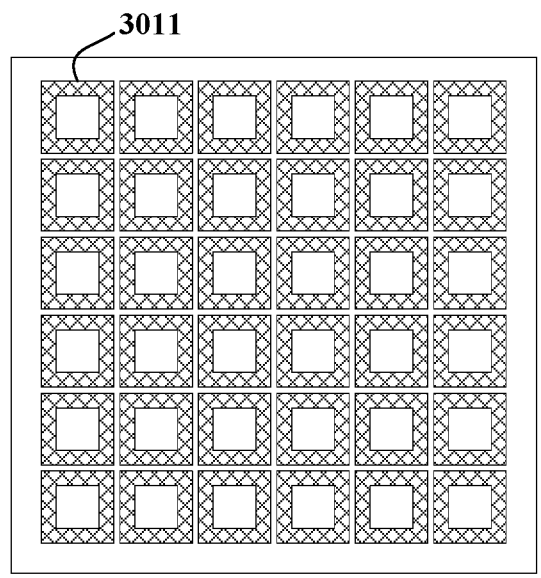
FIG. 2 is a schematic diagram illustrating the structure of an antenna layer in some embodiments according to the present disclosure.

In some embodiments, the antenna layer 301 includes a plurality of antennas. FIG. 2 is a schematic diagram illustrating the structure of an antenna layer in some embodiments according to the present disclosure. Referring to FIG. 2, in some embodiments, the antenna layer includes a matrix of a plurality of antennas 3011. A respective one of the plurality of antennas 3011 may have various appropriate shapes, such as a rectangular plate shape (see, e.g., FIG. 2), a square shape, a polygonal shape, a triangular shape, a circular shape, and so on. Optionally, the plurality of antennas 3011 are a plurality of patch antennas as shown in FIG. 2.

Figure 3:
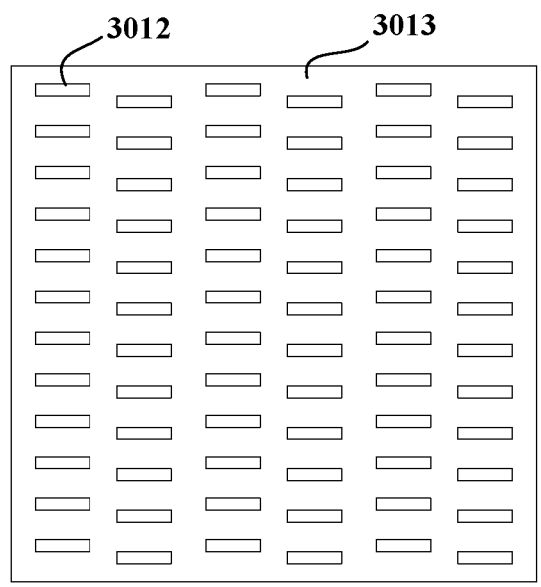
FIG. 3 is a schematic diagram illustrating the structure of an antenna layer in some embodiments according to the present disclosure.

FIG. 3 is a schematic diagram illustrating the structure of an antenna layer in some embodiments according to the present disclosure. Referring to FIG. 3, in some embodiments, the antenna layer is a slotted waveguide antenna including a plurality of slot antennas 3012 in a waveguide 3013.

In some embodiments, the antenna layer covers at least 30% of an entire light transmitting area of the smart window, for example, the antenna layer covers at least 40%, at least 50%, at least 60%, at least 70%, at least 80%, at least 90%, at least 95%, or at least 99%, of the entire light transmitting area of the smart window. Optionally, the antenna layer covers at least 50% of the entire light transmitting area of the smart window. Optionally, the antenna layer covers at least 80% of the entire light transmitting area of the smart window. Optionally, the antenna layer covers at least 90% of the entire light transmitting area of the smart window. As used herein, the term "light transmitting area" in the context of the smart window of the present disclosure refers to an area of the smart window where various layers of the smart window overlap. For example, the light transmitting area of the smart window corresponds to a region in which orthographic projections on a base layer (e.g., a first substantially transparent base layer 101 in FIG. 1) of various layers of the smart window (e.g., including the first substantially transparent conductive layer 102, the ion storage layer 103, the electrolyte layer 104, the electrochromic layer 105, and the second substantially transparent conductive layer 106) overlap.

Various appropriate materials may be used for making the antenna layer 301. Optionally, the antenna layer 301 is made of a substantially transparent material. Examples of appropriate materials for making the antenna layer 301 include one or a combination of silver coated polyester film, indium tin oxide, and fluorine doped tin oxide.

In some embodiments, and referring to FIG. 1, the smart window further includes a switch 303 configured to switch on and off a charging circuit for the smart window. A first terminal of the switch 303 is electrically connected to the first substantially transparent conductive layer 102, the second terminal of the switch 303 is electrically connected to the second substantially transparent conductive layer 106 through the antenna layer 301. A first terminal of the antenna layer 301 is electrically connected to the first substantially transparent conductive layer 102 through the switch 303, and a second terminal of the antenna layer 301 is electrically connected to the second substantially transparent conductive layer 106.

Light transmission of the smart window can be controlled by the charging circuit. As discussed above, the smart window is capable of switching between a substantially transparent state and a dimmed state. When the switch 303 is OFF, an electrical potential is not applied to the smart window, e.g., between the first substantially transparent conductive layer 102 and the second substantially transparent conductive layer 106. The smart window is in the substantially transparent state allowing relatively higher light transmission. When the switch 303 is ON, the charging circuit applies an electrical potential to the smart window, e.g., between the first substantially transparent conductive layer 102 and the second substantially transparent conductive layer 106. The smart window is in the dimmed state allowing relatively lower light transmission.

In some embodiments, and referring to FIG. 1, the smart window further includes a converter 304 electrically connected to the antenna layer 301 and configured to convert the wireless power transmissions received by the antenna layer 301 into an electrical energy. Optionally, the wireless power transmissions received by the antenna layer 301 is a radio frequency, and the converter 304 is a radio frequency converter configured to convert the radio frequency into the electrical energy.

In some embodiments, the converter 304 is a radio frequency-direct current converter. Optionally, the converter 304 utilizes impedance matching to maximize power transfer. Optionally, the converter 304 includes a voltage multiplier. The conversion efficiency of the converter 304 is related to the accuracy of impedance matching and the energy efficiency of the voltage multiplier.

In some embodiments, and referring to FIG. 1, the smart window further includes a first substantially transparent base layer 101 and a second substantially transparent base layer 107 facing the first substantially transparent base layer 101. The first substantially transparent conductive layer 102, the ion storage layer 103, the electrolyte layer 104, the electrochromic layer 105, and the second substantially transparent conductive layer 106 are sandwiched between the first substantially transparent base layer 101 and the second substantially transparent base layer 107. Optionally, the antenna layer 301 is also sandwiched between the first substantially transparent base layer 101 and the second substantially transparent base layer 107. Optionally, the antenna layer 301 is on a side of the second substantially transparent conductive layer 106 away from the electrochromic layer 105, and is between the second substantially transparent conductive layer 106 and the second substantially transparent base layer 107. Optionally, the antenna layer 301 is formed on a side of the first substantially transparent conductive layer 102 away from the ion storage layer 103, and is formed between the first substantially transparent conductive layer 102 and the first substantially transparent base layer 101.

Figure 4:
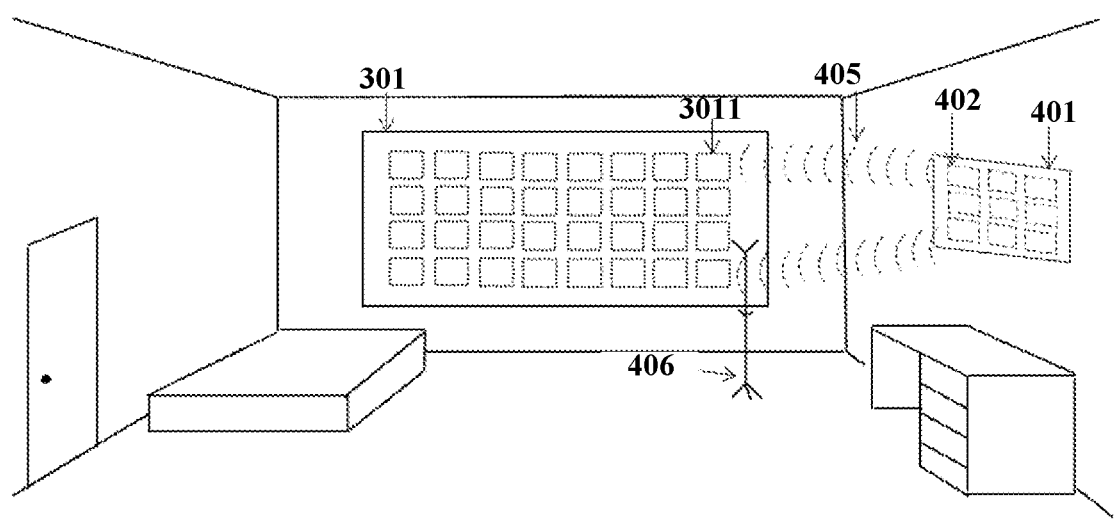
FIG. 4 is a schematic diagram illustrating the structure of a smart window system in some embodiments according to the present disclosure.

In another aspect, the present disclosure further provides a smart window system. In some embodiments, the smart window system includes a smart window described herein or fabricated by a method described herein, and a wireless power transmission source configured to transmit the wireless power transmissions to the antenna layer. FIG. 4 is a schematic diagram illustrating the structure of a smart window system in some embodiments according to the present disclosure. Referring to FIG. 4, the smart window system includes a wireless power transmission source 401 configured to transmit the wireless power transmissions to the antenna layer 301. The wireless power transmission source 401 includes a plurality of power transmission antennas 402. In one example, the plurality of power transmission antennas 402 are configured to transmit a radio frequency to the plurality of antennas 3011 in the antenna layer 301.

In the present smart window system, because the antenna layer 301 covers a relatively large light transmitting area of the smart window, the charging efficiency can be significantly enhanced. Also, the issue of the wireless power transmissions being blocked by an object (e.g., a furniture 406 in FIG. 4) can be obviated due to the large receiving area. Further, because the total receiving area is relatively large, transmission energy density in unit area can be relatively lowered, making it easier to control the wireless power transmissions in a way that is not harmful to human health. In FIG. 4, the wireless power transmission source 401 is disposed on a wall.

Figure 5:
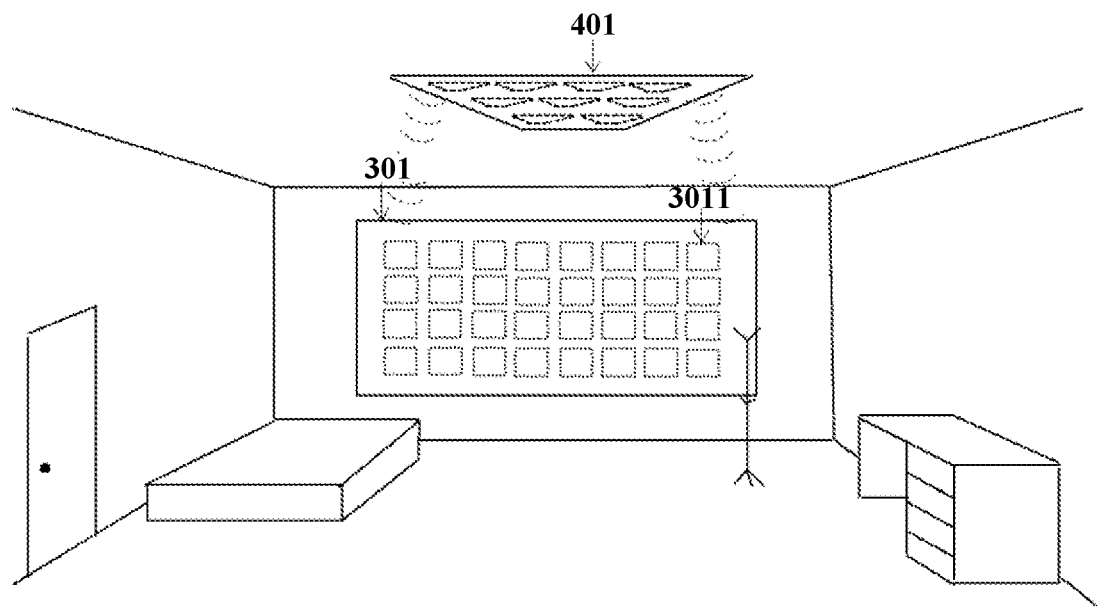
FIG. 5 is a schematic diagram illustrating the structure of a smart window system in some embodiments according to the present disclosure.

FIG. 5 is a schematic diagram illustrating the structure of a smart window system in some embodiments according to the present disclosure. Referring to FIG. 5, the wireless power transmission source 401 is disposed on a ceiling to avoid the signal being blocked by furniture.

In another aspect, the present disclosure provides a method of fabricating a smart window configured to transition between a substantially transparent state and a dimmed state. In some embodiments, the method includes forming a first substantially transparent conductive layer; forming an ion storage layer on the first substantially transparent conductive layer; forming an electrolyte layer on a side of the ion storage layer away from the first substantially transparent conductive layer; forming an electrochromic layer on a side of the electrolyte layer away from the ion storage layer; forming a second substantially transparent conductive layer on a side of the electrochromic layer away from the electrolyte layer; and forming an antenna layer configured to receive wireless power transmissions to provide energy for the smart window to transition between the substantially transparent state and the dimmed state by depositing an antenna material on a layer of the smart window and patterning the antenna material. Optionally, the antenna layer is formed so that an orthographic projection of the electrochromic layer on the first substantially transparent conductive layer substantially covers an orthographic projection of the antenna layer on the first substantially transparent conductive layer.

In some embodiments, the antenna layer is formed to cover at least 30% of an entire light transmitting area of the smart window, for example, the antenna layer is formed to cover at least 40%, at least 50%, at least 60%, at least 70%, at least 80%, at least 90%, at least 95%, or at least 99%, of the entire light transmitting area of the smart window. Optionally, the antenna layer is formed to cover at least 50% of the entire light transmitting area of the smart window. Optionally, the antenna layer is formed to cover at least 80% of the entire light transmitting area of the smart window. Optionally, the antenna layer is formed to cover at least 90% of the entire light transmitting area of the smart window.

In some embodiments, the method further includes forming a charging circuit. The charging circuit is formed by providing a switch, connecting a first terminal of the switch to the first substantially transparent conductive layer, and connecting a second terminal of the switch to the second substantially transparent conductive layer through the antenna layer. Optionally, the step of forming the charging circuit further includes connecting a first terminal of the antenna layer to the first substantially transparent conductive layer through the switch, and connecting a second terminal of the antenna layer to the second substantially transparent conductive layer. Optionally, the step of forming the charging circuit further includes providing a converter electrically connected to the antenna layer and configured to convert the wireless power transmissions received by the antenna layer into an electrical energy.

In some embodiments, the method further includes forming a first substantially transparent base layer and forming a second substantially transparent base layer facing the first substantially transparent base layer. The first substantially transparent conductive layer, the ion storage layer, the electrolyte layer, the electrochromic layer, and the second substantially transparent conductive layer are formed to be sandwiched between the first substantially transparent base layer and the second substantially transparent base layer. Optionally, the antenna layer is also formed to be sandwiched between the first substantially transparent base layer and the second substantially transparent base layer. Optionally, the antenna layer is formed on a side of the second substantially transparent conductive layer away from the electrochromic layer, and is formed between the second substantially transparent conductive layer and the second substantially transparent base layer. Optionally, the antenna layer is formed on a side of the first substantially transparent conductive layer away from the ion storage layer, and is formed between the first substantially transparent conductive layer and the first substantially transparent base layer.

Various appropriate electrochromic materials may be used for making the electrochromic layer. Examples of appropriate electrochromic materials include inorganic metal oxides, such as WO3, NiO, or TiO2, or organic substances, such as bipyridinium salt (viologen) derivatives, quinone-based derivatives including anthraquinone, or azine-based derivatives including phenothiazine. Various processes, such as an etching process, a screen-printing process, an imprinting process or an inkjet printing process, can be used for patterning the electrochromic layer.

Various appropriate substantially transparent conductive materials may be used for making the first substantially transparent conductive layer and the second substantially transparent conductive layer. Examples of appropriate substantially transparent conductive materials include indium zinc oxide (IZO), an indium tin oxide (ITO), an aluminum doped zinc oxide (AZO), a boron doped zinc oxide (BZO), a tungsten doped zinc oxide (WZO) and a tungsten doped tin oxide (WTO), a fluorine doped tin oxide (FTO), a gallium doped zinc oxide (GZO), an antimony doped tin oxide (ATO), an indium doped zinc oxide (IZO), a niobium doped titanium oxide, and a zinc oxide (ZnO).

Various appropriate ion storage materials may be used for making the ion storage layer. Examples of appropriate ion storage materials include materials including iridium and/or tantalum such as a hydrogenated iridium oxide having a formula of $HaIrO_2$ (0<a<2) and a hydrogenated tantalum oxide having a formula of $HbTa_2O_5$ (0<b<5).

Various appropriate electrolyte materials may be used for making the electrolyte layer. Examples of appropriate electrolyte materials include materials including tantalum oxide, zirconium oxide, potassium perchlorate, lithium perchlorate, and sodium perchlorate. Optionally, the electrolyte layer is a solid electrolyte layer.

In another aspect, the present disclosure provides a method of operating a smart window. In some embodiments, the method includes integrating an antenna layer in a smart window configured to transition between a substantially transparent state and a dimmed state; receiving wireless power transmissions by the antenna layer to provide energy for the smart window to transition between the substantially transparent state and the dimmed state; and powering the smart window to transition between the substantially transparent state and the dimmed state. Optionally, the method further includes generating the wireless power transmissions by a wireless power transmission source; and transmitting the wireless power transmissions to the antenna layer.

In one example, integrating the antenna layer in a smart window includes adhering the antenna layer in a surface of another layer of the smart window. For example, the antenna layer may be adhered to a substantially transparent layer (e.g., to a glass or a film) that substantially covers an entire light transmitting area of the smart window (e.g., covers at least 50%, at least 80%, or at least 90% of the entire light transmitting area of the smart window). Optionally, a substantially transparent protective film or layer can be attached on the antenna layer to protect the antenna layer. Connection wires can be provided to connect the electrodes of the antenna layer with other components of the smart window.

In some embodiments, the method further includes determining whether a present power capacity of the smart window is below a first threshold value. Optionally, the wireless power transmission source generates the wireless power transmissions upon a determination that the present power capacity of the smart window is below the first threshold value. In one example, the first threshold value is 20% of a full power capacity of the smart window.

In some embodiments, the method further includes determining whether a present power capacity of the smart window is higher than or equal to a second threshold value. Optionally, the wireless power transmission source discontinues generation of the wireless power transmissions upon a determination that the present power capacity of the smart window is higher than or equal to the second threshold value. In one example, the second threshold value is 95% of a full power capacity of the smart window.

Figure 6:
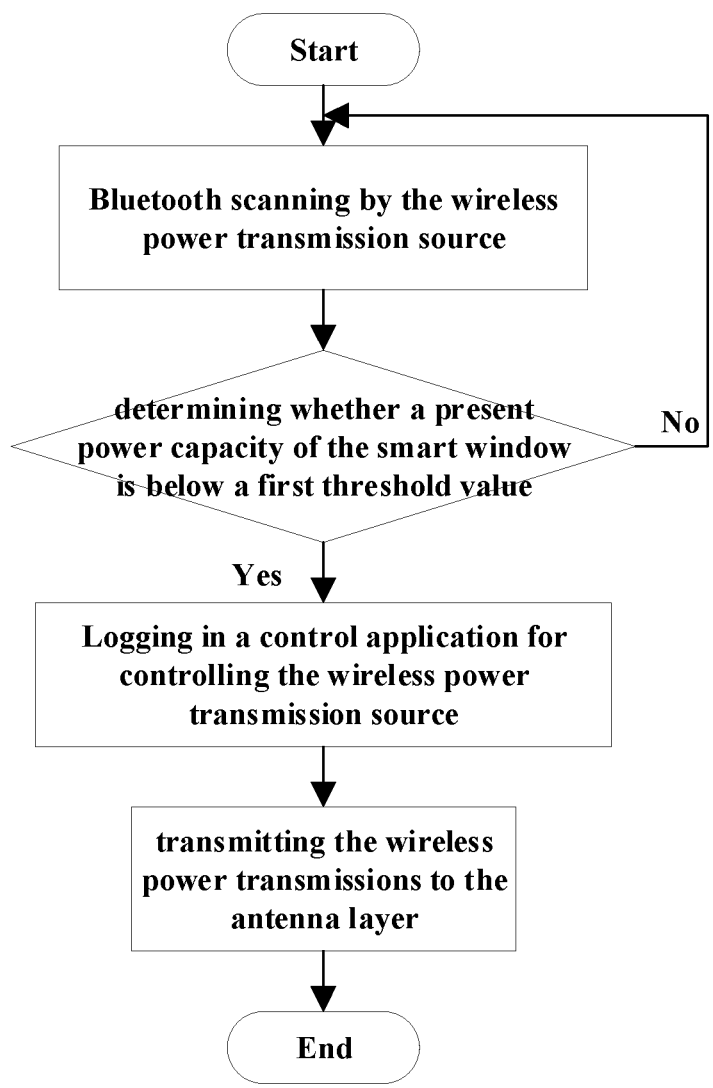
FIG. 6 is a flow chart illustrating a method of operating a smart window in some embodiments according to the present disclosure.

FIG. 6 is a flow chart illustrating a method of operating a smart window in some embodiments according to the present disclosure. Referring to FIG. 6, the wireless power transmission source first performs a Bluetooth scanning at regular intervals through an internal Bluetooth communication module, to determine whether any nearby smart window needs wireless charging. If the wireless charging is not needed (e.g., the present power capacity of the smart window is above a first threshold value), the wireless power transmission source continues the Bluetooth scanning. If the wireless charging is needed (e.g., the present power capacity of the smart window is below the first threshold value), it logs in to a control application for controlling the wireless power transmission source to enable wireless charging. The control application acts as a communication channel between the wireless power transmission source and the antenna layer. After logging in to the control application, the wireless power transmission source is controlled to transmit the wireless power transmissions to the antenna layer.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A smart window configured to transition between a substantially transparent state and a dimmed state, comprising:
    a first substantially transparent conductive layer;
    an ion storage layer on the first substantially transparent conductive layer;
    an electrolyte layer on a side of the ion storage layer away from the first substantially transparent conductive layer;
    an electrochromic layer on a side of the electrolyte layer away from the ion storage layer;
    a second substantially transparent conductive layer on a side of the electrochromic layer away from the electrolyte layer;
    an antenna layer configured to receive wireless power transmissions to provide energy for directly powering the smart window to transition between the substantially transparent state and the dimmed state;
    a switch configured to switch on and off a charging circuit for the smart window; and
    a converter electrically connected to the antenna layer and configured to convert the wireless power transmissions received by the antenna layer into an electrical energy;
    wherein the electrochromic layer comprises an electrochromic material sandwiched between the electrolyte layer and the second substantially transparent conductive layer; and
    an orthographic projection of the electrochromic layer on the first substantially transparent conductive layer substantially covers an orthographic projection of the antenna layer on the first substantially transparent conductive layer;
    wherein a first terminal of the antenna layer is electrically connected to the first substantially transparent conductive layer; and
    a second terminal of the antenna layer is electrically connected to the converter;
    the converter is electrically connected to a first terminal of the switch; and
    a second terminal of the switch is electrically connected to the second substantially transparent conductive layer through the antenna layer.

2. The smart window of claim 1, wherein the antenna layer covers at least 50% of an entire light transmitting area of the smart window.

3. The smart window of claim 1, wherein the antenna layer covers at least 80% of an entire light transmitting area of the smart window.

4. The smart window of claim 1, wherein the antenna layer covers at least 90% of an entire light transmitting area of the smart window.

5. The smart window of claim 1, wherein the antenna layer is configured to receive a radio frequency; and
    the converter is a radio frequency converter configured to convert the radio frequency into the electrical energy.

6. The smart window of claim 1, further comprising a first substantially transparent base layer and a second substantially transparent base layer facing the first substantially transparent base layer;
    wherein the first substantially transparent conductive layer, the ion storage layer, the electrolyte layer, the electrochromic layer, and the second substantially transparent conductive layer are sandwiched between the first substantially transparent base layer and the second substantially transparent base layer.

7. The smart window of claim 1, wherein the antenna layer is on a side of the second substantially transparent conductive layer away from the electrochromic layer.

8. The smart window of claim 1, wherein the antenna layer comprises a substantially transparent material.

9. The smart window of claim 8, wherein the substantially transparent material is selected from a group consisting of silver coated polyester film, indium tin oxide, and fluorine doped tin oxide.

10. The smart window of claim 1, wherein the antenna layer comprises a slotted waveguide antenna.

11. A smart window system, comprising the smart window of claim 1; and a wireless power transmission source configured to transmit the wireless power transmissions to the antenna layer.

12. A method of operating a smart window, comprising:
integrating an antenna layer in a smart window configured to transition between a substantially transparent state and a dimmed state;
receiving wireless power transmissions by the antenna layer to provide energy for directly powering the smart window to transition between the substantially transparent state and the dimmed state; and
powering the smart window to transition between the substantially transparent state and the dimmed state using the energy provided by the antenna layer;
wherein the smart window comprises:
a first substantially transparent conductive layer;
an ion storage layer on the first substantially transparent conductive layer;
an electrolyte layer on a side of the ion storage layer away from the first substantially transparent conductive layer;
an electrochromic layer on a side of the electrolyte layer away from the ion storage layer;
a second substantially transparent conductive layer on a side of the electrochromic layer away from the electrolyte layer;
a switch configured to switch on and off a charging circuit for the smart window; and
a converter electrically connected to the antenna layer and configured to convert the wireless power transmissions received by the antenna layer into an electrical energy;
wherein the electrochromic layer comprises an electrochromic material sandwiched between the electrolyte layer and the second substantially transparent conductive layer; and
an orthographic projection of the electrochromic layer on the first substantially transparent conductive layer substantially covers an orthographic projection of the antenna layer on the first substantially transparent conductive layer;
wherein a first terminal of the antenna layer is electrically connected to the first substantially transparent conductive layer; and
a second terminal of the antenna layer is electrically connected to the converter;
the converter is electrically connected to a first terminal of the switch; and
a second terminal of the switch is electrically connected to the second substantially transparent conductive layer through the antenna layer.

13. The method of claim 12, further comprising generating the wireless power transmissions by a wireless power transmission source; and transmitting the wireless power transmissions to the antenna layer.

14. The method of claim 13, further comprising determining whether a present power capacity of the smart window is below a threshold value;
wherein the wireless power transmission source generates the wireless power transmissions upon a determination that the present power capacity of the smart window is below the threshold value.

15. The method of claim 12, wherein the wireless power transmissions is received by the antenna layer covering at least 50% of an entire light transmitting area of the smart window.

16. The method of claim 15, wherein the wireless power transmissions is received by the antenna layer covering at least 80% of the entire light transmitting area of the smart window.

17. The method of claim 15, wherein the wireless power transmissions is received by the antenna layer covering at least 90% of the entire light transmitting area of the smart window.

18. A method of fabricating a smart window configured to transition between a substantially transparent state and a dimmed state, comprising:
forming a first substantially transparent conductive layer;
forming an ion storage layer on the first substantially transparent conductive layer;
forming an electrolyte layer on a side of the ion storage layer away from the first substantially transparent conductive layer;
forming an electrochromic layer on a side of the electrolyte layer away from the ion storage layer;
forming a second substantially transparent conductive layer on a side of the electrochromic layer away from the electrolyte layer;
forming an antenna layer configured to receive wireless power transmissions to provide energy for directly powering the smart window to transition between the substantially transparent state and the dimmed state by depositing an antenna material on a layer of the smart window and patterning the antenna material;
forming a switch configured to switch on and off a charging circuit for the smart window; and
forming a converter electrically connected to the antenna layer and configured to convert the wireless power transmissions received by the antenna layer into an electrical energy;
wherein the electrochromic layer comprises an electrochromic material sandwiched between the electrolyte layer and the second substantially transparent conductive layer; and
the antenna layer is formed so that an orthographic projection of the electrochromic layer on the first substantially transparent conductive layer substantially covers an orthographic projection of the antenna layer on the first substantially transparent conductive layer;
wherein a first terminal of the antenna layer is electrically connected to the first substantially transparent conductive layer; and
a second terminal of the antenna layer is electrically connected to the converter;
the converter is electrically connected to a first terminal of the switch; and
a second terminal of the switch is electrically connected to the second substantially transparent conductive layer through the antenna layer.

* * * * *